Patented Aug. 17, 1943

2,327,128

UNITED STATES PATENT OFFICE 2,327,128

PRODUCTION OF PASTES FROM POLYMERIZED VINYL CHLORIDE

Archibald Renfrew and James William Davison, Norton-on-Tees, England, assignors to Imperial Chemical Industries Limited, a corporation of Great Britain No Drawing. Application July 30, 1940, Serial No. 348,540. In Great Britain September 7, 1939

5 Claims. (Cl. 260—36)

This invention relates to the production of smooth, flowable pastes from polymerized vinyl chloride and plasticisers and gelatinised films prepared from said pastes.

Various processes have been proposed for obtaining plastic masses from polyvinyl compounds, amongst which, gelatinisation processes have been mentioned. In particular, it has been proposed to take polyvinyl compounds in finely divided condition and to distribute them uniformly, while avoiding pressure and/or heating, in a practically non-volatile plasticising agent in which they are from scarcely soluble to insoluble at ordinary temperature and to gelatinise the dispersion so obtained by heating without the application of pressure to temperatures at which complete gelatinisation occurs.

When working according to the above prior proposal it has been found to be a matter of some difficulty to obtain uniform dispersions of polyvinyl chloride in plasticiser whilst avoiding the use of pressure and/or heating. Frequently, the mixture is obtained in the form of a moist powder which is difficult to use for certain purposes, e. g. it cannot easily be spread to form films by subsequent gelatinisation.

It is an object of this invention to provide a method whereby smooth flowable paste of polyvinyl chloride and a plasticiser or mixture of plasticisers may be readily prepared. It is a further object of this invention to provide a method whereby polyvinyl chloride and a plasticiser or mixture of plasticisers may be mixed at temperatures substantially above room temperature without substantial gelatinisation taking place. It is also an object of this invention to provide gelatinised films either on or not on supports by gelatinising the pastes prepared in accordance with this invention. Further objects will appear hereinafter.

In accordance with our invention smooth pastes may be readily prepared from polyvinyl chloride and plasticisers by a process which comprises mixing polyvinyl chloride with a plasticiser or with a mixture of plasticisers, said mixing being carried out in two stages, the first stage comprising mixing the said plasticiser or plasticisers with 5–10% by weight of polyvinyl chloride and the second stage comprising mixing the remainder of the polyvinyl chloride with the product of the first stage mixing, the proportion of plasticiser in the final composition being 35%–80% by weight.

The advantage of our newly proposed method of operation lies in the fact that the first mixing stage may be carried out at elevated temperatures, preferably 60° C.–100° C., whereby a smooth mixture is very readily obtained, which mixture is far more readily mixable with polyvinyl chloride than is a plasticiser or plasticiser mixture containing no polymer. The second stage of mixing may also be carried out at an elevated temperature if desired, but it is inadvisable to carry out this stage at temperatures above 70° C. on account of the danger of gelatinisation occurring.

Whilst the proportion of polyvinyl chloride to be incorporated at the first mixing stage has been stated to be 5–10% by weight calculated on the plasticiser used and whilst any quantity within this range will give the advantage of the invention, it may be desirable in some cases to determine the optimum amount within the range. As this optimum depends on a large number of variables, amongst which may be mentioned the molecular weight of the polymer, its state of division, the nature of the plasticiser and the relative proportion of plastiser to polymer in the final mix, it is desirable to determine said optimum by means of a preliminary experiment.

Similarly, any mixing temperature within the ranges specified will give the advantages of the invention but it may nevertheless be found desirable to carry out preliminary tests in order to determine the optimum temperature for one or both of the mixing stages. In general, the mixing temperatures are chosen so as to be high enough to facilitate mixing but, especially in the second stage, not so high as to promote gelatinisation.

If desired, our above proposed process may be employed in conjunction with that described in our copending application Serial No. 348,541, filed July 30, 1940, in which it is proposed to employ, for the purpose of making pastes, a mixture of "soluble" and "insoluble" polyvinyl chloride. In this connection, by "soluble polyvinyl chloride" we mean polyvinyl chloride which is at least 50% soluble by weight in acetone at room temperature, whilst by "insoluble polyvinyl chloride" we mean polyvinyl chloride which is not more than 15% soluble by weight in acetone at room temperature. When using the present process in conjunction with that of our copending application Ser. No. 348,541, filed July 30, 1940, the two forms of polyvinyl chloride may first be mixed together and then employed, in accordance with the present invention, as though they constituted one sample of polyvinyl chloride or, more advantageously, the whole or part of the "soluble" polyvinyl chloride may first be mixed with the plasticiser, after which this mixture is uniformly mixed with the remaining polyvinyl chloride (it being understood that the proportion of polymer to be incorporated in the first stage mixing is always to be within the range 5–10% by weight on the plasticiser used). If desired, the polymer to be used in the first stage mixing may be the "insoluble" type, but this method of working is less advantageous than those described above, as the initial mixing does not take place so readily.

The plasticisers employed may be any of those well known in the synthetic resin industry, provided they are substantially non-solvent at room temperature for "insoluble" polyvinyl chloride (as defined above). We have found tri-cresyl phosphate to be particularly suitable, other suitable plasticisers being dibutyl phthalate, diamyl phthalate, triethyl citrate, glyceryl tributyrate and ethyl cinnamate. The higher the viscosity of the plasticiser, the higher is the lower limit to the desirable proportions of plasticiser to be added. Thus, tricresyl phosphate should be used in proportions of 50%–80% by weight on the polyvinyl chloride, whereas dibutyl phthalate may be used in proportions of 45%–80% by weight on the polyvinyl chloride. With plasticisers of unusually high viscosity, e. g. chlorinated diphenyls, it is desirable not to use less than 60% plasticiser by weight on the polyvinyl chloride.

In order that our invention may be fully understood, we give the following by way of example, to which, however, our invention is in no way limited. The parts are by weight. By "$k$ value" we mean a viscosity index as defined in Cellulose Chemie 1932, pp. 58 and 71.

Example I 10 gms. of polyvinyl chloride ($k$ value=60) were uniformly mixed in a pestle and mortar with 100 gms. of tricresyl phosphate at 120° C. The resulting syrup, which appeared to be a solution of the polymer in the plasticiser, was then uniformly mixed in a pestle and mortar at 60° C. with 90 gms. of polyvinyl chloride ($k$ value=60). A viscous, but readily "flowable" paste was obtained which could be readily spread on surfaces and which formed tough, flexible films on gelatinisation by heating for 15 minutes at 160° C.

Example II

One part of polyvinyl chloride ($k$ value=67) was uniformly mixed with 10 parts of dibutyl phthalate in a steam jacketed blade mixer at 60° C. After 15 minutes mixing, the mixture was cooled at 15° C. and 9 parts of polyvinyl chloride ($k$ value=67) were added. Mixing was continued for 15 minutes at 15° C., at the end of which time the mixture was in the form of a smooth, flowable viscous paste.

Example III

One part of "soluble polyvinyl chloride" (as hereinbefore defined) was mixed in the dry state by agitation with 9 parts of "insoluble polyvinyl chloride" (as hereinbefore defined). The resulting mixture was then employed as a batch of polyvinyl chloride to produce paste by the method described in Example II above. The paste obtained was similar to that obtained in Example II.

Example IV

One part of "soluble polyvinyl chloride" (as hereinbefore defined) was uniformly mixed with 10 parts of tricresyl phosphate in a steam jacketed blade mixer at 70° C. After 15 minutes mixing, the mixture was cooled to 20° C. and 9 parts of "insoluble polyvinyl chloride" (as hereinbefore defined) were added. Mixing was continued for 15 minutes at 20° C., at the end of which time the mixture was in the form of a smooth, free-flowing paste.

Pastes prepared in accordance with our invention are particularly suitable for the production of gelatinised films. Such films may be prepared for use as such or may be prepared on backing materials upon which they are to remain in use, e. g. coated textiles. The following examples illustrate the application of our pastes to the production of such materials.

Example V

A sample of the paste prepared in accordance with Example II was uniformly spread onto a glass plate at room temperature by means of a knife, to give a coating 0.01" in thickness. The film was then gelatinised by heating it, on its glass support, at 160° C. for 6 minutes. At the end of this period, gelatinisation had been completed and the film was stripped off the glass support. The film was tough, flexible and transparent.

Example VI

A textile base was coated at room temperature by means of doctor knife with a paste prepared as described in Example II. The thickness of the coating was 0.01". The coated textile was then passed through a tunnel heated to 160° C., the time of passage being 6 minutes. At the end of this time, the film was completely gelatinised and formed a tough, flexible coating which adhered well to the textile backing. If desired the treated textile may be further treated in embossing rolls to produce an imitation grain.

As many apparently widely different embodiments of this invention may be made without departing from the spirit and scope thereof, it is to be understood that the invention is not limited to the specific embodiments thereof except as defined in the appended claims.

We claim:

1. A process for making smooth, flowable pastes from polyvinyl chloride and at least one plasticizer from the group consisting of tricresyl phosphate, dibutyl phthalate, diamyl phthalate, triethyl citrate, glyceryl tributyrate, and ethyl cinnamate which comprises conducting the mixing operation in two stages, the first stage comprising the mixing of plasticizer and 5%–10% thereof by weight of polyvinyl chloride at a sufficiently elevated temperature to facilitate solution and the second stage comprising mixing the remainder of the polyvinyl chloride with the product of the first mixing stage at a temperature not above 70° C. and low enough to avoid gelatinization of the mix and to produce a smooth flowable paste, the proportion of plasticizer in the final paste being 35%–80% by weight.

2. A process for making smooth, flowable pastes from polyvinyl chloride and at least one plasticizer selected from the group consisting of tricresyl phosphate, dibutyl phthalate, diamyl phthalate, triethyl citrate, glyceryl tributyrate and ethyl cinnamate which comprises conducting the mixing operation in two stages, the first stage comprising the mixing of plasticizer and 5%–10% thereof by weight of polyvinyl chloride at a temperature within the range of 60° to 120° C., sufficiently elevated to facilitate solution, and the second stage comprising mixing the remainder of the polyvinyl chloride with the product of the first mixing stage at a temperature not above 70° C. and low enough to avoid gelatinization of the mix and to produce a smooth flowable paste, the proportion of plasticizer in the final paste being 35%–80% by weight.

3. A process for making smooth, flowable pastes from polyvinyl chloride and at least one plasticizer selected from the group consisting of tricresyl phosphate, dibutyl phthalate, diamyl phthalate, triethyl citrate, glyceryl tributyrate and ethyl cinnamate which comprises conducting the mixing operation in two stages, the first stage comprising the mixing of plasticizer and 5%–10% thereof by weight of polyvinyl chloride at a temperature within the range of 60° to 100° C., sufficiently elevated to facilitate solution, and the second stage comprising mixing the remainder of the polyvinyl chloride with the product of the first mixing stage at a temperature not above 70° C. and low enough to avoid gelatinization of the mix and to produce a smooth flowable paste, the proportion of plasticizer in the final paste being 35%–80% by weight.

4. A process for making smooth, flowable pastes from a mixture of polyvinyl chlorides having different solubility characteristics in acetone at room temperature and at least one plasticizer selected from the group consisting of tricresyl phosphate, dibutyl phthalate, diamyl phthalate, triethyl citrate, glyceryl tributyrate and ethyl cinnamate which comprises conducting the mixing operation in two stages, the first stage comprising the mixing of plasticizer and 5%–10% thereof by weight of polyvinyl chloride at a temperature within the range of 60° to 100° C., sufficiently elevated to facilitate solution, and the second stage comprising mixing the remainder of the polyvinyl chloride with the product of the first mixing stage at a temperature not above 70° C. and low enough to avoid gelatinization of the mix and to produce a smooth flowable paste, the proportion of plasticizer in the final paste being 35%–80% by weight.

5. A process for making smooth, flowable pastes from a mixture of polyvinyl chlorides having solubilities not more than 15% and not less than 50% respectively in acetone at room temperature and at least one plasticizer selected from the group consisting of tricresyl phosphate, dibutyl phthalate, diamyl phthalate, triethyl citrate, glyceryl tributyrate and ethyl cinnamate which comprises conducting the mixing operation in two stages, the first stage comprising the mixing of plasticizer and 5%–10% thereof by weight of polyvinyl chloride at a temperature within the range of 60° to 100° C., sufficiently elevated to facilitate solution, and the second stage comprising mixing the remainder of the polyvinyl chloride with the product of the first mixing stage at a temperature not above 70° C. and low enough to avoid gelatinization of the mix and to produce a smooth flowable paste, the proportion of plasticizer in the final paste being 35%–80% by weight.

ARCHIBALD RENFREW.
JAMES WILLIAM DAVISON.